July 17, 1934.  F. J. OAKES ET AL  1,966,831
DRIVE
Filed April 9, 1931   3 Sheets-Sheet 1
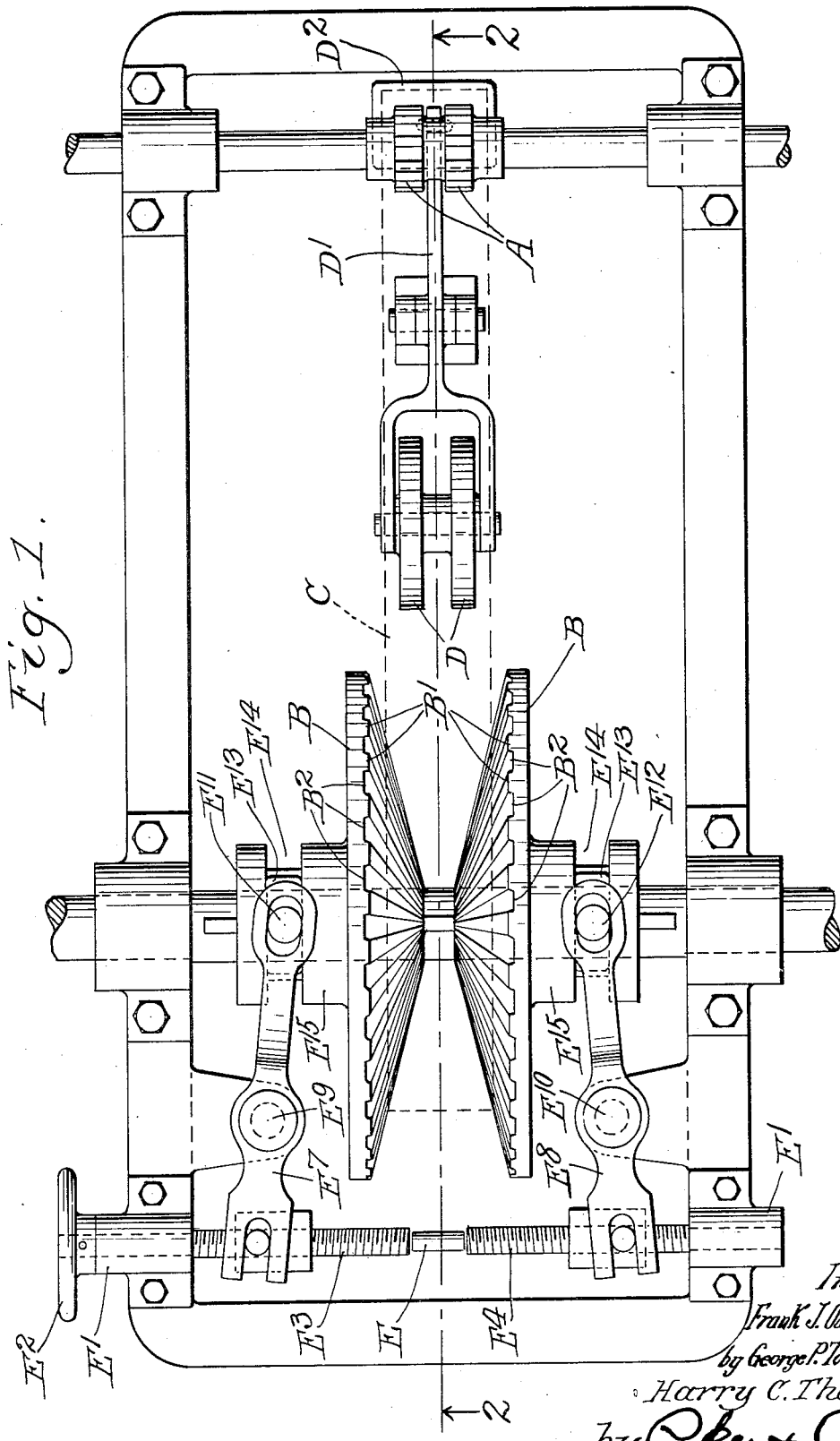

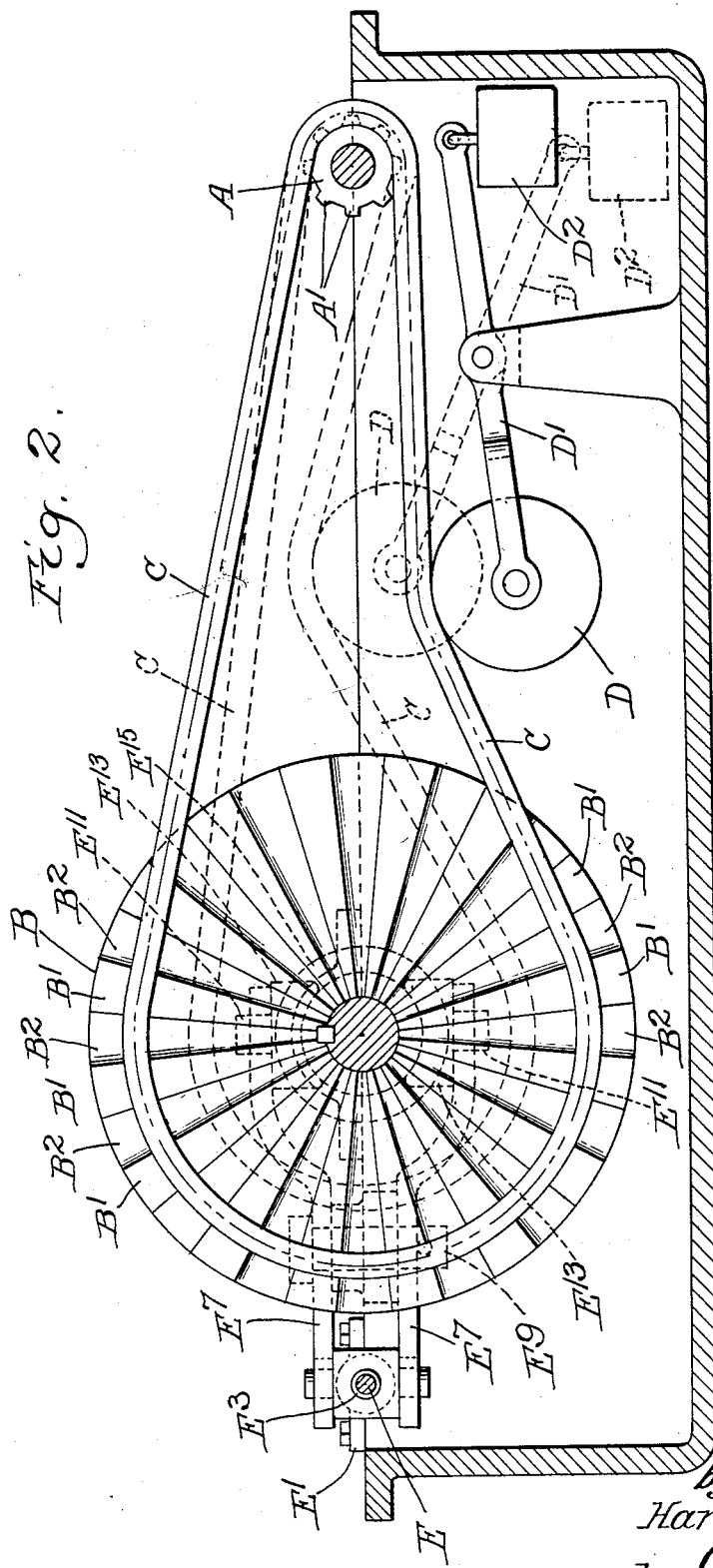

July 17, 1934.  F. J. OAKES ET AL  1,966,831
DRIVE
Filed April 9, 1931   3 Sheets-Sheet 3
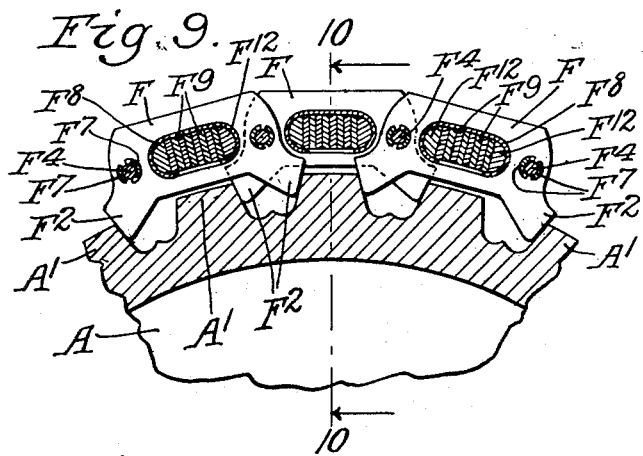
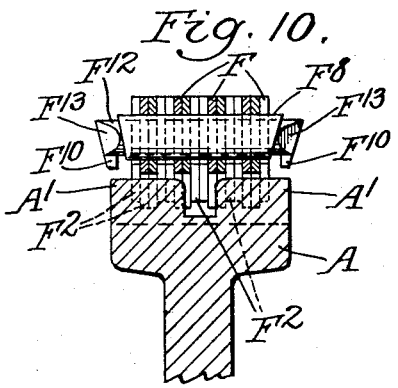
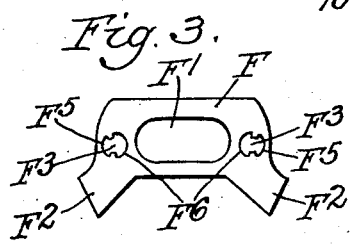
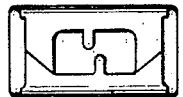
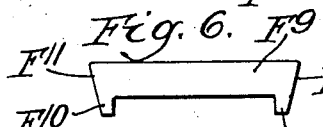
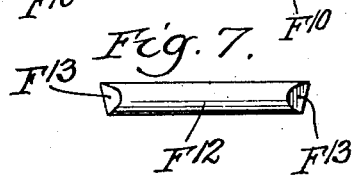
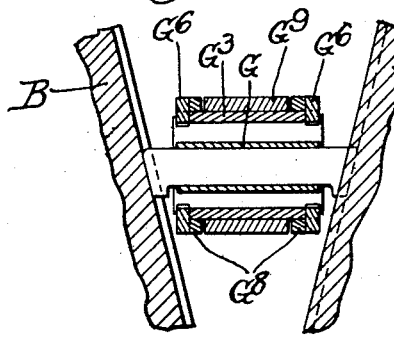
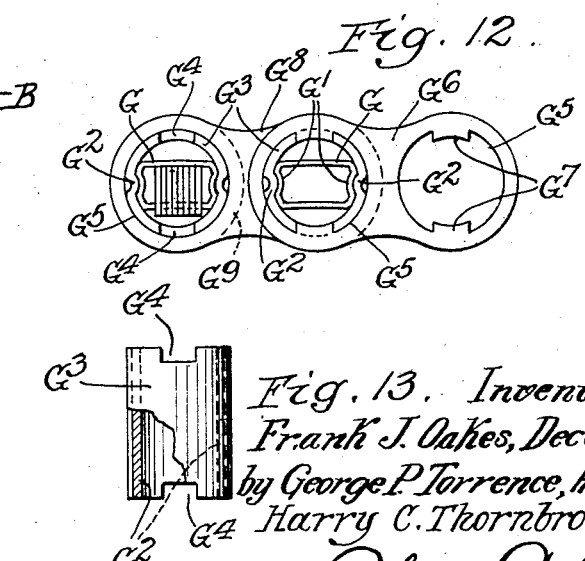
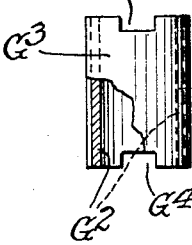
Inventors:-
Frank J. Oakes, Deceased,
by George P. Torrence, Adminis.
Harry C. Thornbrough
by Parker & Carter,
Attorneys.

Patented July 17, 1934

1,966,831

UNITED STATES PATENT OFFICE 1,966,831

DRIVE

Frank J. Oakes, deceased, late of Indianapolis, Ind., by George P. Torrence, administrator, and Harry C. Thornbrough, both of Indianapolis, Ind., assignors to Link-Belt Company, Chicago, Ill., a corporation of Illinois Application April 9, 1931, Serial No. 528,748

13 Claims. (Cl. 74—217)

This invention relates to improvements in transmissions and particularly to variable speed transmissions in which there is a positive drive.

One object of the invention is to permit variation in the speed ratio of driving and driven members with the use of only one chain member. Another object is to provide a transmission of this general type in which the speed ratio can be changed while the parts are running under load. Another object is to combine in a drive a fixed diameter sprocket or gear with a member of variable effective working diameter.

Other objects will appear from time to time in the specification and claims.

This invention is illustrated more or less diagrammatically in the accompanying drawings, wherein—

Figure 1 is a top plan view of my drive;

Figure 2 is a longitudinal section taken at line 2—2 of Figure 1;

Figure 3 is a side elevation of one form of a chain link;

Figure 4 is a side elevation of a pin;

Figure 5 is a perspective showing a bushing;

Figure 6 is a plan view of a driving slat or lamination;

Figure 7 is a side elevation of an end slat or lamination member;

Figure 8 is a plan view of a cage;

Figure 9 is an enlarged fragmentary sectional view through a sprocket, showing the chain in position thereon;

Figure 10 is a transverse vertical cross section through line 10—10 of Figure 9;

Figure 11 is a plan view showing the chain in mesh with the faces of an expanding gear, the gear in section;

Figure 12 is a side elevation of a modified form of chain;

Figure 13 is a detailed elevational view of a bushing used in such chain;

Figure 14 is a transverse vertical cross section through the chain indicated in Figure 12, showing it in mesh with the faces of an expanding gear similar to that shown in Figure 11.

Like parts are designated by like characters throughout the specification and drawings.

A is a sprocket wheel carried upon any suitable shaft which is supported in appropriate bearings. The sprocket has teeth $A^1$. The details of the shaft and bearing mounting of the sprocket form no particular part of the present invention as it is sufficient that the sprocket be mounted for rotation. The sprocket may be the driven member or it may be the driving member.

Discs B, provided on their inner faces with teeth $B^1$, separated by depressions $B^2$, are mounted to be moved toward and from each other in a manner and by means which will be described below.

A chain C is mounted to travel about the sprocket A and to engage the teeth on the discs or wheels B.

An idler D is mounted to engage the chain C. It is carried in suitable bearings upon an arm $D^1$ and by means of a counter-weight $D^2$ is held in engagement with the chain so as to take up slack in the chain. The idler will follow the chain as indicated in the dotted line position in case the point of contact of the chain with the discs B is changed, as shown in Figure 2.

In Figure 1 the means is shown for mounting and for moving or adjusting the conical discs forming the expanding gears so that the effective working diameter of the gears may be changed.

A shaft E is journaled in suitable bearings $E^1$. It is provided with a hand wheel $E^2$ and a pair of oppositely formed threaded portions $E^3$, $E^4$. $E^5$, $E^6$ are internally threaded blocks mounted, respectively, on the threaded portions $E^3$, $E^4$ and engaging the upper ends of levers $E^7$, $E^8$, which are carried in suitable bearings $E^9$, $E^{10}$, respectively. The inner arms or ends of the levers $E^7$, $E^8$ engage studs $E^{11}$, $E^{12}$ which project outwardly from the parts $E^{13}$. These penetrate within grooves $E^{14}$, $E^{14}$ formed in members $E^{15}$ which are attached to the wheels or discs B. By movement of the levers $E^7$, $E^8$ through the studs $E^{11}$, $E^{12}$, the discs may be moved toward or from each other.

The particular housing, bearing, shaft arrangements and other structural details are not shown in complete detail and are not described in detail, as their details form no particular part of the present invention. For the purposes of this invention it is sufficient that there be a member such as the member A which may be a sprocket or a gear and that there be another member such as the member formed by the discs B, B of such nature that the effective working diameter of this member may be varied.

In Figures 3 to 8, inclusive, are shown the details of one form of a chain. F is a chain link having a preferably arcuate aperture $F^1$, teeth portions $F^2$, $F^2$ and perforations $F^3$ to receive pintles $F^4$. Preferably the perforations are provided with enlargements $F^5$, $F^6$ to receive generally segmental bushings $F^7$. A hollow cage $F^8$, shaped to fit into the preferably arcuate aperture $F^1$, surrounds and retains slats or laminations $F^9$ which have end projections $F^{10}$, $F^{10}$ and are preferably inclined at their outer ends as at $F^{11}$. $F^{12}$ are end laminations provided with inclined outer end faces $F^{13}$. At each end of the bundle of laminations which is positioned within the cage $F^8$ one of the relatively thicker end laminations $F^{12}$ is used.

In Figures 3 to 11, inclusive, there is shown in detail and in assembly and use a chain of the so-called silent chain type. The bundles of laminations have a sliding movement as indicated particularly in Figure 11, so that as they come into contact with the faces of the disc B they slip into engagement as indicated in Figure 11. In this position, and when in engagement with members such as the members B, the teeth $F^2$ of the chain are not in engagement. The teeth are provided to engage a sprocket such as that shown in Figures 9 and 10 and they engage it in the manner shown, and when the chain is in engagement with the sprocket the laminations do not engage the sprocket. This is indicated clearly in Figure 10. Thus the chain is provided with two different types of engaging parts or members so that the same chain may be used on different forms of driving or driven members.

In Figures 12, 13 and 14 there is shown a modified form of chain. It is of the roller chain type. The laminations are of the same type shown in the earlier mentioned forms and discussed above. The cage G which encloses the laminations is preferably arcuate and formed at its ends with depressions $G^1$, $G^1$ to engage ridges $G^2$ formed on the inner face of bushings $G^3$. These bushings are provided with notches $G^4$ at their ends and are positioned within perforations $G^5$ in the side bars $G^6$ of the chain. Members $G^7$ project into the perforations $G^5$ and engage the notches or cut away portions $G^4$ of the bushings $G^3$. The inner side bars $G^8$ are perforated and positioned about the outside of the bushings $G^3$ and are free to articulate about the bushing. Rollers $G^9$ are positioned about the bushings $G^3$. These rollers make contact with the teeth on sprockets or other similar members about which the chain is positioned and with which it engages.

In Figure 14 the chain is shown in use between a pair of discs B, B, such as the discs shown in the earlier mentioned figures. In this form the engagement is with the laminations. The chain may engage with the sprocket having suitable teeth, and when that is the case, the engagement between the sprocket teeth and the chain is made by the rollers $G^9$ and the laminations are not in engagement with any part of the sprocket, the driving or driven effect being accomplished entirely through the roller chain.

An important feature of the invention is the provision in a single chain of engaging means or parts adapted to engage totally different sorts of driving or driven elements. In the various forms shown the chain engages a sprocket wheel in the conventional manner and the laminations carried by the chain engage a conical disc type of pulley formed to have a variable effective working diameter and this general combination of elements adapted to furnish the variable speed characteristics to the chain may be combined with an almost infinite number of other chain types. They need not be combined with the inverted toothed type chain shown in the first figures nor with the roller type chain shown in the other figures.

It will be realized that whereas a practical operative device has been herewith shown and described, nevertheless many changes might be made in the size, shape, number and disposition of parts without departing from the spirit of the invention and therefore, the showing may be taken as in a sense diagrammatic.

The use and operation of the invention are as follows:

The parts are assembled as shown in Figure 2. The chain is of the so-called silent type and embodies inverted teeth formed on the chain links shown particularly in Figure 9 and adapted to engage the teeth of a sprocket wheel. The chain is also provided with the laminated members which are adapted to contact and engage with the teeth of the discs B. The wheels or discs are preferably so mounted with respect to each other that a groove $B^2$ on one face is opposite a tooth $B^1$ on the other face. The slats or laminations are capable of a small lateral movement so that as the chain enters the V-shaped cavity between the faces of the two discs, as shown for example in Figure 14, the teeth on one disc or wheel push certain of the laminations across to form effective teeth on the chain on the opposite side and to mesh with the opposite tooth on the opposite disc or wheel. Thus the teeth of the discs contact and move certain of the laminations to form effective teeth on the chain to engage or mesh with the teeth on the opposite disc.

The discs are mounted to permit relative axial movement. Preferably equal movement of each disc is provided. The moving mechanism shown in Figure 1 provides such equal movement and thus as the distance of the two discs from each other is varied, the position of the center line of the chain meshing with the gear faces is not moved. As the discs are moved toward or from each other and the distance between them correspondingly varies, the chain will move with relation to the center of the discs, moving in or out as the case may be. A change in speed ratio is accomplished by this relative movement of the discs and by the resulting change in the effective working diameter of the disc faces. This in turn changes the length of the chain required for the drive and a take-up is necessary to maintain a constant length of pitch line. The idler D is provided for this purpose. It may bear directly against the back of the chain or may be toothed to mesh with a link tooth of the chain. Where this is done, certain special inverted links are built into the chain to mesh with the teeth of the take-up idler D. The diameter of the idler and its possible movement must be such as to provide a take-up of chain equal to the maximum change in chain length that will be obtained between the two extreme effective working diameters of the adjustable disc faces.

In the form shown in Figure 14, the operation of the chain is generally the same as that described above. Such a chain may be used with the sprocket and discs as shown in Figure 1. When the chain is in mesh with the sprocket the contact is made through rollers which engage the sprocket teeth and when the chain is in mesh with the discs the contact is through the laminations which engage the teeth in the faces of the discs. Relative movement of the discs will cause the same movement of the chain and the same variation in effective diameter of the disc as the relative movement which occurs when the other form of chain is used.

Whatever form of chain may be used, and the two which are shown herewith are shown only to indicate two possible forms, the chain will embody two types of engaging or contacting members so that the single chain may engage with two different types of driving or driven members and thus there is combined in one drive a variable speed device with one fixed diameter sprocket or corresponding member, and one disc or driving or driven member of variable effective diameter, the two meshing with a single chain.

What is claimed is:—

1. In combination in a chain, a link formed with outwardly projecting parts adapted to engage a sprocket about which the chain may be positioned, said chain including pulley engaging members mounted for transverse movement, bodily with respect to the chain as a whole.

2. In combination in a chain, a plurality of links formed with outwardly projecting parts adapted to engage a sprocket about which the chain may be positioned, said chain including pulley engaging members mounted for transverse sliding movement, bodily with respect to the chain as a whole.

3. In combination in a chain, a link formed with outwardly projecting parts adapted to engage a sprocket about which the chain may be positioned, said chain including pulley engaging members mounted for limited transverse sliding movement, bodily with respect to the chain as a whole.

4. In combination in a chain, a plurality of links, each formed with outwardly projecting parts adapted to engage a sprocket about which the chain may be positioned, said chain including pulley engaging members mounted for limited transverse sliding movement, bodily with respect to the chain as a whole.

5. In combination with a sprocket of fixed diameter and a pulley of variable effective diameter, said sprocket provided with teeth on its periphery and the pulley provided with teeth in its side, a drive chain adapted to mesh wtih the sprocket and the pulley, provided in its sides with members mounted for bodily cross-wise movement adapted to engage the pulley teeth and provided along its longitudinal axis with members adapted to engage the sprocket teeth.

6. In combination with a sprocket of fixed diameter, a pulley of variable effective diameter, said sprocket provided with teeth on its periphery and the pulley provided with teeth in its side, a drive chain adapted to mesh with the sprocket and the pulley, provided in its sides with movable members mounted for bodily cross-wise movement adapted to engage the pulley teeth and provided along its longitudinal axis with members adapted to engage the sprocket teeth.

7. In combination, a sprocket of fixed diameter and a two part pulley of variable effective diameter, said sprocket provided with teeth on its periphery and the two-part pulley provided with radial teeth in its side, a drive chain adapted to mesh with the sprocket and the pulley, provided in its sides with movable members mounted for bodily cross-wise movement and each adapted to engage the pulley teeth of both parts of the pulley and provided along its longitudinal axis with members adapted to engage the sprocket teeth.

8. In combination in a chain, a link formed with tooth parts adapted to engage a sprocket about which the chain may be positioned, said chain including positive drive pulley engaging members mounted for transverse movement, bodily with respect to the chain as a whole each pulley-engaging member adapted to contact two pulleys simultaneously.

9. In combination in a chain, a link formed with tooth parts adapted to engage a sprocket about which the chain may be positioned, said chain including positive drive pulley engaging members mounted for limited transverse movement, bodily with respect to the chain as a whole each pulley-engaging member adapted to contact two pulleys simultaneously.

10. In combination in a chain, a plurality of articulated links formed with outwardly projecting parts adapted to engage a sprocket, about which the chain may be positioned, the sprocket engaging parts positioned inwardly with respect to the points of articulation of the chain, said chain including pulley engaging members mounted for transverse movement as a whole bodily with respect to the chain as a whole.

11. In combination in a chain, a link formed with outwardly projecting parts adapted to engage a sprocket about which the chain may be positioned, said chain including pulley engaging members each adapted to engage two pulleys and each mounted for transverse sliding movement, bodily with respect to the chain as a whole.

12. In combination with a sprocket of fixed diameter and a pulley of variable effective diameter, said sprocket provided with teeth on its periphery and the pulley provided with teeth in its side, a drive chain adapted to mesh with the sprocket and the pulley, provided in its sides with movable members for positive drive connection with the pulley teeth and provided along its longitudinal axis, in a plane perpendicular to the plane of said movable members, with parts adapted to engage the sprocket teeth.

13. In combination, a sprocket of fixed diameter and a two part pulley of variable effective diameter, said sprocket provided with teeth on its periphery and the two-part pulley provided with radial teeth in its side, a drive chain adapted to mesh with the sprocket and the pulley, provided in its sides with movable members for positive drive connection with the pulley teeth and provided along its longitudinal axis, in a plane perpendicular to the plane of said movable members, with parts adapted to engage the sprocket teeth.

GEORGE P. TORRENCE,
*Administrator of the Estate of Frank J. Oakes, Deceased.*

HARRY C. THORNBROUGH.